(12) United States Patent
Lim et al.

(10) Patent No.: US 9,911,291 B2
(45) Date of Patent: Mar. 6, 2018

(54) PORTABLE DEVICE FOR OUTPUTTING VIRTUAL VIBRATION USING VIBRATORS

(71) Applicant: Samsung Electronics Co., Ltd., Suwon-si (KR)

(72) Inventors: Soochul Lim, Seoul (KR); Joonah Park, Seoul (KR); Seungchan Kim, Hwaseong-si (KR); Jungsoon Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/928,323

(22) Filed: Oct. 30, 2015

(65) Prior Publication Data

US 2016/0125710 A1 May 5, 2016

(30) Foreign Application Priority Data

Oct. 31, 2014 (KR) .................. 10-2014-0150343

(51) Int. Cl.
- *G08B 21/00* (2006.01)
- *G08B 6/00* (2006.01)
- *G06F 3/01* (2006.01)

(52) U.S. Cl.
CPC .............. *G08B 6/00* (2013.01); *G06F 3/016* (2013.01)

(58) Field of Classification Search
CPC ....................................... G08B 6/00

USPC .......................................... 340/407.1, 407.2
See application file for complete search history.

(56) References Cited

U.S. PATENT DOCUMENTS

| 8,798,534 B2 | 8/2014 | Rodriguez et al. |
| 2012/0028577 A1* | 2/2012 | Rodriguez ....... H04N 21/44008 455/41.1 |
| 2012/0116672 A1 | 5/2012 | Forutanpour et al. |
| 2013/0115579 A1 | 5/2013 | Taghavi |
| 2013/0207792 A1 | 8/2013 | Lim et al. |
| 2013/0261811 A1* | 10/2013 | Yagi ................. G06F 3/016 700/280 |
| 2014/0180582 A1 | 6/2014 | Pontarelli et al. |

FOREIGN PATENT DOCUMENTS

| JP | 2005-258666 A | 9/2005 |
| JP | 4258664 B2 | 4/2009 |
| KR | 10-2006-0036000 A | 4/2006 |
| KR | 10-0588526 B1 | 6/2006 |
| KR | 10-0912256 B1 | 8/2009 |
| KR | 10-1089850 B1 | 12/2011 |
| KR | 10-1424233 B1 | 7/2014 |

* cited by examiner

*Primary Examiner* — Jeffery Hofsass
(74) *Attorney, Agent, or Firm* — NSIP Law

(57) ABSTRACT

A portable device for outputting virtual vibration is provided. The portable device includes a controller configured to generate a control signal corresponding to a detected event. The portable device also includes vibrators configured to output virtual vibration based on the control signal.

13 Claims, 14 Drawing Sheets

PORTABLE DEVICE FOR OUTPUTTING VIRTUAL VIBRATION USING VIBRATORS

CROSS-REFERENCE TO RELATED APPLICATION(S)

This application claims the benefit under 35 USC 119(a) of Korean Patent Application No. 10-2014-0150343, filed on Oct. 31, 2014, in the Korean Intellectual Property Office, the entire disclosure of which is incorporated herein by reference for all purposes.

BACKGROUND

1. Field

The following description relates to a vibration interface of a portable device.

2. Description of Related Art

Vibration feedback is used for an interface of a portable device. The vibration feedback, together with visual feedback and auditory feedback, assist in multitasking. The vibration feedback is output by a vibration motor in the portable device.

Currently, vibration feedback is used only to inform an occurrence of an event. However, it is difficult for users to differentiate between various events occurring in a portable device based on the vibration feedback alone. Accordingly, vibration feedback for a variety of touch is required. Vibration feedback is important for a device that is in contact with a body of a user, for example a wearable device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a portable device, including: a controller configured to generate a control signal corresponding to a detected event; and vibrators configured to output virtual vibration based on the control signal.

The vibrators may include a first vibrator and a second vibrator, and wherein the first vibrator and the second vibrator may output the virtual vibration by outputting different patterns of vibration based on the control signal.

Based on the control signal, the vibrators may be configured to output virtual vibration moving from a first vibrator to a second vibrator by outputting vibration having a gradually decreasing amplitude through the first vibrator and by outputting vibration having a gradually increasing amplitude through the second vibrator.

The portable device may also include a strap, wherein the vibrators may be configured to output virtual vibration moving along the strap, based on the control signal.

The virtual vibration may rotate along the strap.

The portable device may include a body and a strap, and wherein, based on the control signal, the vibrators may be configured to output virtual vibration moving from the body to the strap.

Based the detected event, the virtual vibration may be identified by at least one of an output position, a moving direction, and a moving speed.

Based on a control signal corresponding to a signal reception event, the vibrators may be configured to output virtual vibration moving from a first point to a second point, and, based on a control signal corresponding to a signal transmission event, the vibrators are configured to output virtual vibration moving from the second point to the first point.

Based on a control signal corresponding to a drag event, the vibrators may be configured to output virtual vibration moving in a drag direction.

The portable device may also include a storage configured to store a vibration pattern matched to the event, wherein the controller may be configured to generate the control signal based on the vibration pattern.

The portable device may also include a sensing processor configured to sense a user input to an input area, the input area being at least a portion of an area adjacent to the portable device; and an event detector configured to detect the event based on the user input.

The user input may include at least one of a tap input, a touch-and-hold input, a double tap input, a drag input, a panning input, a flick input, a drag-and-drop input, a swipe input, and a pinch input, which are performed by a user on the input area.

Based on the control signal, the controller may control a start time of the virtual vibration output, an end time of the virtual vibration, a frequency of the virtual vibration, and an amplitude of the virtual vibration.

The virtual vibration corresponding to a signal reception event and a virtual vibration corresponding to the signal transmission event may move in opposite directions.

In accordance with an embodiment, there is provided a portable device, including: a controller configured to generate a control signal corresponding to a detected event; and a vibrating processor configured to output a first vibration to an external device, based on the control signal, wherein the portable device is configured to receive a second vibration based on the event, and the first vibration and the second vibration cause virtual vibration to occur between the portable device and the external device.

The vibrating processor may be configured to output the first vibration in response to a signal transmission event in which a signal is transmitted to the external device.

The vibrating processor may be configured to output a vibration having a gradually decreasing amplitude, and the portable device is configured to receive a vibration having a gradually increasing amplitude.

The virtual vibration may be identified by at least one of an output position, a moving direction, and a moving speed based on the event.

The vibrating processor may include a first vibrator and a second vibrator, and the first vibrator and the second vibrator may output virtual vibration to the portable device, by outputting different patterns of vibration based on the control signal.

The vibrating processor may include a first vibrator and a second vibrator, and, based on the control signal, is configured to output virtual vibration moving from the first vibrator to the second vibrator by outputting vibration having a gradually decreasing amplitude through the first vibrator, and by outputting vibration having a gradually increasing amplitude through the second vibrator.

In response to a file reception event, the vibrating processor is configured to output vibration having an amplitude increasing based on reception of a file, and, in response to a file transmission event, the vibrating processor is configured to output vibration having an amplitude decreasing based on transmission of a file.

The portable device may also include an event detector configured to detect the event occurring between the portable device and an external device.

In accordance with an embodiment, there is provided an operating method of a portable device, the operating method including: generating a control signal corresponding to a detected event; and outputting virtual vibration moving from a first point to a second point based on the control signal.

Other features and aspects will be apparent from the following detailed description, the drawings, and the claims.

Figure 1:
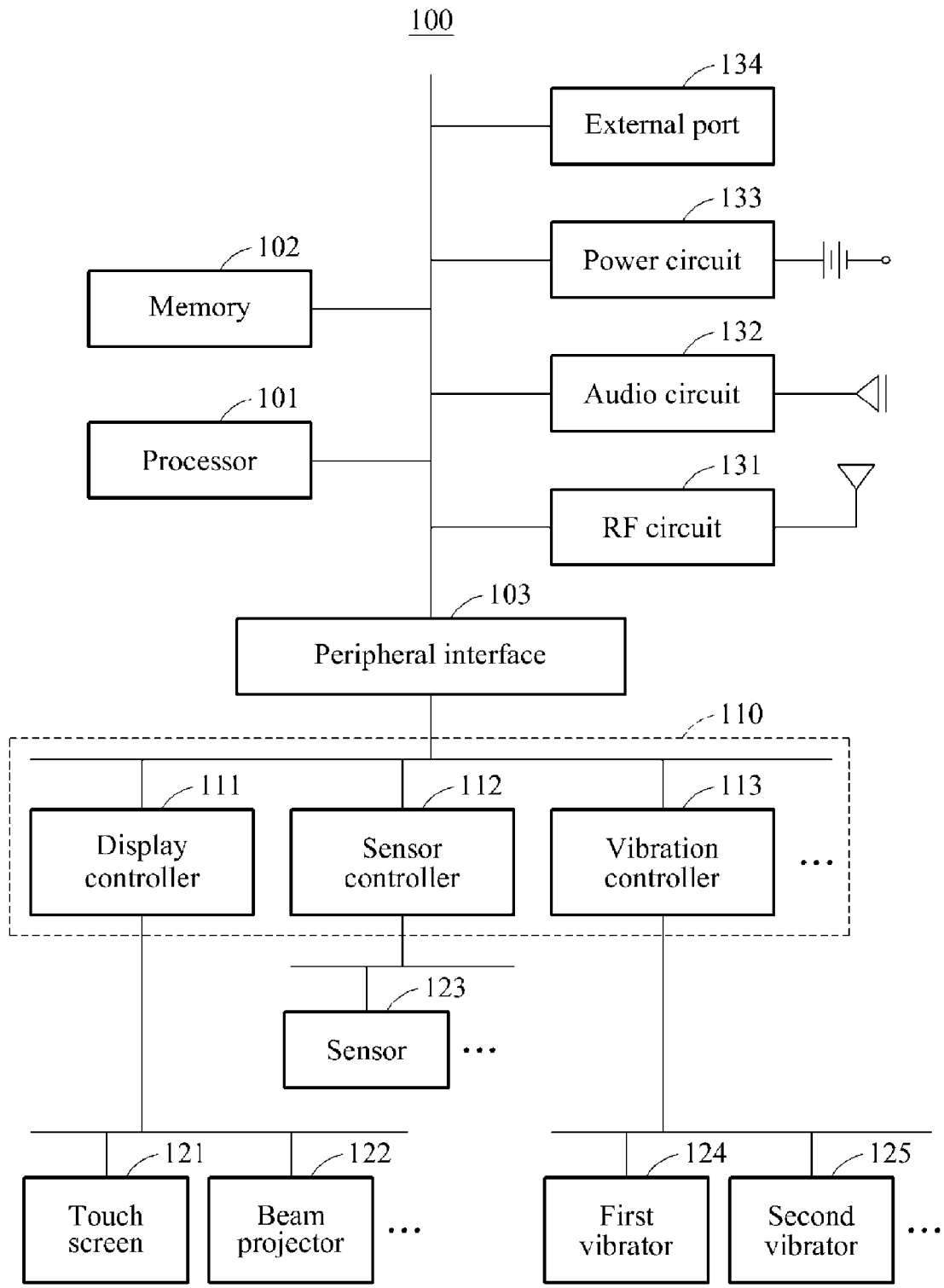
FIG. 1 illustrates an example of a portable device, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Like reference numerals in the drawings denote like elements, and redundant descriptions of like elements will be omitted herein. When it is determined a detailed description of a related known function or configuration they may make the purpose of the present invention unnecessarily ambiguous in describing the present invention, the detailed description will be omitted herein.

FIG. 1 illustrates an example of a portable device 100, in accordance with an embodiment.

Referring to FIG. 1, the portable device 100 includes hardware devices, including, but not limited to at least one processor 101, a memory 102, a peripheral interface 103, an input/output (I/O) subsystem 110, a touch screen 121, a beam projector 122, a sensor 123, a plurality of vibrators, for example, a first vibrator 124 and a second vibrator 125, a radio frequency (RF) circuit 131, an audio circuit 132, a power circuit 133, and an external port 134. The above components communicate with each other through at least one communication bus or at least one signal line.

The portable device 100 of FIG. 1 is merely an example and accordingly, may include more or fewer components than shown in FIG. 1. Although each of the structural devices illustrated and described with respect to FIG. 1 are illustrated and described as individual structural elements, a person of ordinary skill in the relevant art will appreciate that, in an alternative configuration, a single processor may be structurally implemented to perform functionalities associated with each individual structural device. Furthermore, in one example, a configuration of the portable device 100 may combine at least two components, or may have a different configuration or arrangement of the components.

The memory 102 may include, for example, a high-speed random access memory (RAM), a magnetic disc, a static RAM (SRAM), a dynamic RAM (DRAM), a read only memory (ROM), a flash memory, or a nonvolatile memory. The memory 102 is configured to store a set of instructions or data required for an operation of the portable device 100. Additionally, an access to the memory 102 by the other structural components, for example, the processor 101 or the peripheral interface 103, is controlled by the processor 101.

The peripheral interface 103 couples an I/O peripheral device of the portable device 100 to the processor 101 and the memory 102. The processor 101 executes a set of instructions stored in the memory 102 to perform various functions of the portable device 100 and to process data.

The RF circuit 131 transmits and receives an RF signal, such as an electromagnetic signal. The RF circuit 131 converts an electronic signal to or from an electromagnetic signal, and communicates with a communication network and other communication devices via the electromagnetic signal. To perform the above functions, the RF circuit 131 includes, but is not limited to, an antenna system, an RF transceiver, at least one amplifier, a tuner, at least one oscillator, a digital signal processor, a CODEC chipset, a subscriber identity module (SIM) card, and a memory. The RF circuit 131 communicates with networks, such as the Internet, also referred to as the World Wide Web (WWW), an intranet and/or a wireless network, such as a cellular telephone network, a wireless local area network (WLAN) and/or a metropolitan area network (MAN), and with other devices by wireless communication. The wireless communication includes, but is not limited to, Global System for Mobile Communications (GSM), an Enhanced Data GSM Environment (EDGE), a wideband code division multiple access (W-CDMA), a code division multiple access (CDMA), a time division multiple access (TDMA), a Bluetooth, a Wireless Fidelity (Wi-Fi) (such as, IEEE 802.11a, IEEE 802.11b, IEEE 802.11g, IEEE 802.11n, IEEE 802.11ac, IEEE 802.11ad, IEEE 802.11af, or IEEE 802.11hew), a voice over Internet protocol (VoIP), a Worldwide Interoperability for Microwave Access (WiMAX), long term evolution (LTE), LTE-advanced (LTE-A), a protocol for emails (such as, an Internet message access protocol (IMAP) and/or a post office protocol (POP)), instant messaging (such as, an extensible messaging and presence protocol (XMPP), Session Initiation Protocol for Instant Messaging and Presence Leveraging Extensions (SIMPLE), and/or an instant messaging and presence service (IMPS)), or short message service (SMS)), or similar or related communication protocols. Additionally, the wireless communication uses a plurality of communication standards, protocols, and technologies.

The audio circuit 132 provides an audio interface between a user and the portable device 100, using a speaker and/or a microphone. The audio circuit 132 receives audio data from the peripheral interface 103, converts the audio data to an electrical signal, and transmits the electrical signal to the speaker. The speaker converts the electrical signal to a human-audible sound wave. Additionally, the audio circuit 132 receives an electrical signal that the microphone converted from a sound wave. The audio circuit 132 converts the electronic signal to audio data, and transmits the audio data to the peripheral interface 103 for processing. The memory 102 or the RF circuit 131 retrieves or receives the audio data from the peripheral interface 103. In an example, the audio circuit 132 further includes a headset jack. The headset jack provides, for example, an interface between the audio circuit 132 and a mobile audio I/O peripheral device, for example, headphones to output the audio data as human-audible sound waves or a headset with both output and input.

The power circuit 133 is connected to a battery, to supply power to a portion of or all of the components of the portable device 100. The power circuit 133 includes, for example, a power management system, at least one power source, for example, a battery, or an alternating current (AC)), a charging system, a power failure detection circuit, a power converter or inverter, a power status indicator, and other components to generate, manage, and distribute power in the portable device 100.

The I/O subsystem 110 couples an I/O peripheral device to the peripheral interface 103. The I/O peripheral device includes, for example, a touch screen 121, a beam projector 122, a sensor 123, a first vibrator 124, and a second vibrator 125. The I/O subsystem 110 includes a display controller 111, a sensor controller 112, or a vibration controller 113. In an example, the touch screen 121, the beam projector 122, the sensor 123, the first vibrator 124, and the second vibrator 125 are coupled directly to the peripheral interface 103, instead of through the I/O subsystem 110.

In an example, at least one of the processor 101, the peripheral interface 103 and the I/O subsystem 110 are implemented on a single chip. In another example, a portion of at least one of the processor 101, the peripheral interface 103 and the I/O subsystem 110 are implemented on a single chip.

The display controller 111 receives and/or transmits an electrical signal from and/or to the touch screen 121 including a touch-sensitive area. Based on the electrical signal from the display controller 111, the touch screen 121 displays a visual output to the user. The visual output includes, for example, graphics, text, icons, video, and an arbitrary combination thereof (hereinafter, collectively referred to as "graphics"). For example, a portion of or all of the visual output may correspond to a user interface (UI), which will be further described below.

The touch screen 121 may be a screen based on a liquid crystal display (LCD) technology, a light emitting polymer display (LPD) technology, an organic light-emitting diode (OLED) technology, or an active-matrix organic light-emitting diode (AMOLED) technology. Other display technologies may also be used for the touch screen 121. The touch screen 121 and the display controller 111 use any of various types of touch sensing technologies. The touch sensing technologies may include, but not limited to, a capacitive technology, a resistive technology, an infrared technology, and a surface acoustic wave technology. Additionally, the touch screen 121 and the display controller 111 detect a contact, or a movement or breaking of the touch screen 121 and the display controller 111, using other proximity sensor arrays, or other elements used to determine at least one point of contact with the touch screen 121.

The display controller 111 is coupled to a screen that does not include a touch-sensitive area. The screen receives an electrical signal from the display controller 111, and displays a visual output to a user. The screen may use a plasma display panel (PDP) technology, an electronic paper display (EPD) technology, an LCD technology, an LPD technology, an OLED technology, or an AMOLED technology. The screen may use other display technologies. For example, the portable device 100 employing a screen that does not include a touch-sensitive area may provide, as a UI for an operation, an I/O device, for example, a physical keyboard, a mouse, or a physical button.

The display controller 111 transmits an electronic signal to the beam projector 122. Based on the control of the display controller 111, the beam projector 122 displays a visual output to a user. The visual output includes, for example, graphics. In an example, a portion of or all of the visual output corresponds to a UI that will be further described below.

The vibration controller 113 transmits electrical signals to the first vibrator 124 and the second vibrator 125. The electrical signals include driving voltages. Different electrical signals may be applied to the first vibrator 124 and the second vibrator 125. The first vibrator 124 and the second vibrator 125 output vibration feedback based on the electrical signals.

The sensor 123 includes, but it is not limited to, different types of sensors, for example, an optical sensor, a proximity sensor, an image sensor, an acceleration sensor, a global positioning system (GPS) sensor, a magnetic sensor, a tilt sensor, an environment sensor, or a weather sensor. Additionally, the sensor 123 further includes an electromyogram (EMG) sensor, or a motion sensor.

Figure 2:
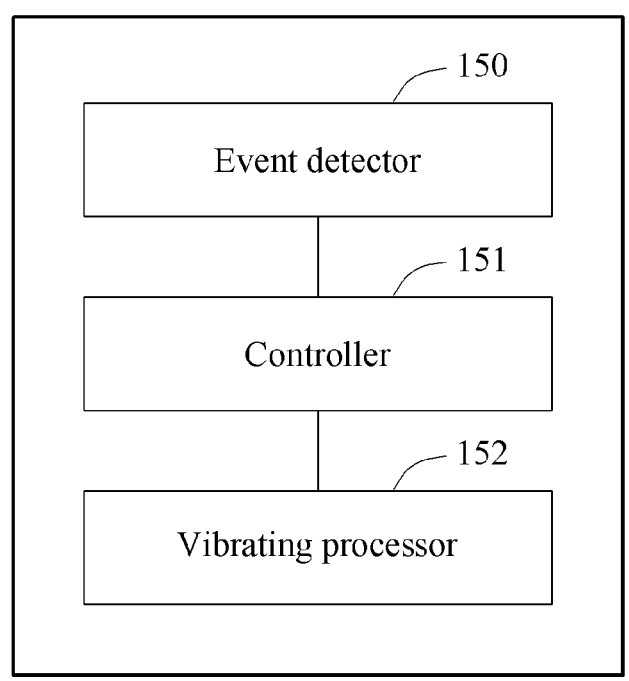
FIG. 2 illustrates an example of a portable device for outputting virtual vibration, in accordance with an embodiment.

FIG. 2 illustrates an example of a portable device 100-1 for outputting virtual vibration, in accordance with an embodiment.

Referring to FIG. 2, the portable device 100-1 includes an event detector 150, a controller 151, and a vibrating processor 152. The vibrating processor 152 includes a plurality of vibrators. The portable device 100-1 may further include a storage and a sensing processor, although not shown in FIG. 2. The portable device 100-1 outputs virtual vibration through the event detector 150, the controller 151, and the vibrating processor 152. Optionally, the portable device 100-1 further stores the virtual vibration in the storage and further outputs the virtual vibration through the sensing processor. Based on the virtual vibration that is output, a user is able to recognize various events occurring in the portable device 100-1.

The event detector 150 detects an event based on an event signal occurring in the portable device 100-1. The event includes, for example, a user input event and a communication event. The user input event includes, for example, a tap input event, a touch-and-hold input event, a double tap input event, a drag input event, a panning input event, a flick input event, a drag-and-drop input event, a swipe input event, and a pinch input event. The communication event includes, for example, a signal transmission event and a signal reception event. The signal transmission event includes, for example, a message transmission event, an outgoing call event, and a file transmission event. The signal reception event includes, for example, a message reception event, an incoming call event, and a file reception event. A file is a data file, for example, texts, sound, or images.

The event detector 150 receives the event signal from peripheral circuits, and detects the event based on the event signal. The event detector 150 detects the event based on sensing data sensed by the sensing processor. For example, the event detector 150 may detect an event based on a user input sensed by the sensing processor. In this example, the user input is input through an input device, or through an input area that is at least a portion of an area adjacent to the portable device 100-1. The input area refers to a virtual area to sense a user input. The user input may include, for example, a tap input, a touch-and-hold input, a double tap input, a drag input, a panning input, a flick input, a drag-and-drop input, a swipe input, and a pinch input.

The controller 151 generates a control signal corresponding to the event. Based on the control signal, the controller 151 controls a start time of vibration output from the vibrating processor 152, an end time of the vibration, a frequency of the vibration, and an amplitude of the vibration. Control signals are generated for each of a plurality of vibrators. In other words, the control signals generated for each of the vibrators differ from each other. For example, assuming that the vibrators include a first vibrator and a second vibrator, a control signal for the first vibrator is different from a control signal for the second vibrator. The control signal for the first vibrator is, for example, a signal to gradually increase an amplitude of vibration, and the control signal for the second vibrator is, for example, a signal to gradually decrease an amplitude of vibration. The controller 151 transmits the control signal to the vibrating processor 152.

In another example, the vibrating processor 152 includes a plurality of vibrators, for example, a first vibrator, a second vibrator, and a third vibrator. Based on the control signal, the vibrators output virtual vibration to the portable device 100-1. The first vibrator and the second vibrator output virtual vibration by outputting different patterns of vibration, based on the control signal. The virtual vibration will be further described with reference to FIGS. 3A through 4.

Figure 3A:
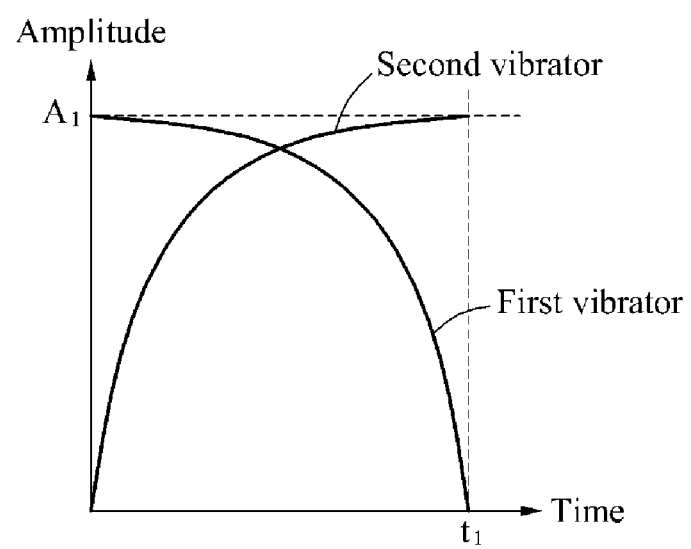
FIGS. 3A and 3B illustrate an example of a principle of generation of virtual vibration, in accordance with an embodiment.
Figure 3B:
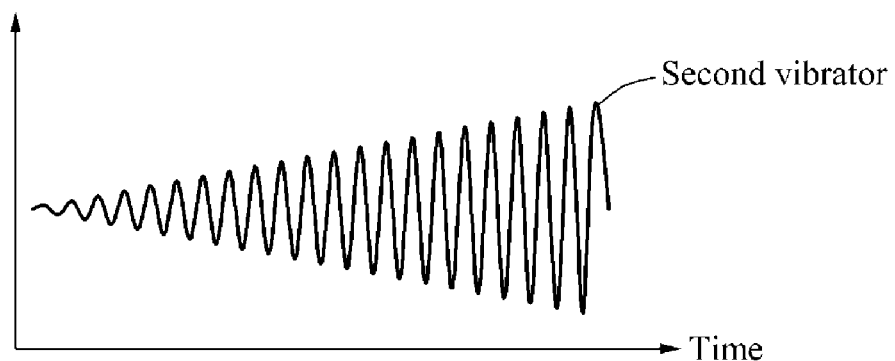
Figure 3B:
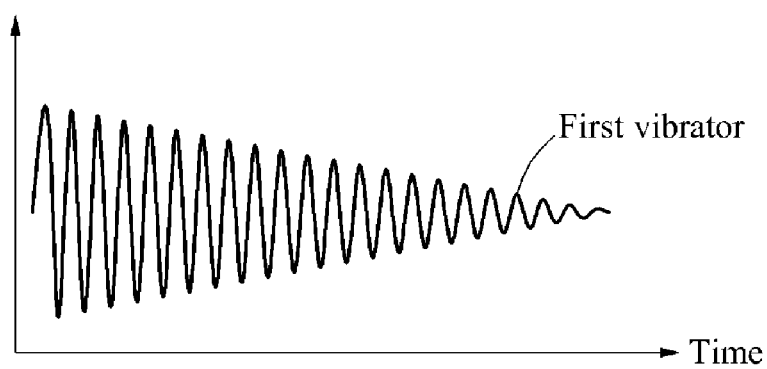

FIGS. 3A and 3B illustrate an example of a principle of generation of virtual vibration, in accordance with an embodiment.

FIG. 3A illustrates an amplitude versus time of vibration output from each of a first vibrator and a second vibrator. While the amplitude of the vibration output from the first vibrator decreases from "A1" to "0," the amplitude of the vibration output from the second vibrator increases from "0" to "A1." The amplitude of the vibration output from the first vibrator monotonically decreases, and the amplitude of the vibration output from the second vibrator monotonically increases.

FIG. 3B illustrates a waveform of each of a first vibrator and a second vibrator based on a time. As described above, while an amplitude of vibration output from the first vibrator decreases, an amplitude of vibration output from the second vibrator increases.

Figure 4:
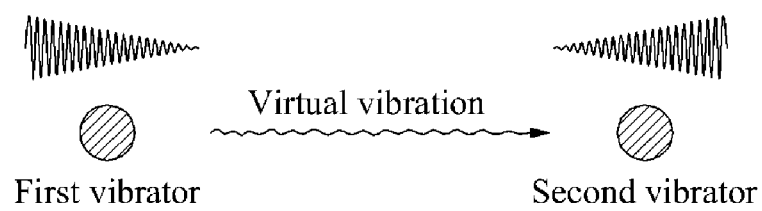
FIG. 4 illustrates an example of a process of generating virtual vibration by a plurality of vibrators, in accordance with an embodiment.

FIG. 4 illustrates an example of a process of generating virtual vibration by a plurality of vibrators, in accordance with an embodiment.

FIG. 4 illustrates a first vibrator and a second vibrator. The first vibrator and the second vibrator output different patterns of vibration, as described above with reference to FIG. 3. In one example, virtual vibration is generated in a direction from the first vibrator to the second vibrator. The virtual vibration refers to vibration that is generated by a fixed vibrator and that allows a user to feel as if the vibration moves. The virtual vibration is generated by adjusting vibration output from a plurality of vibrators.

The portable device 100-1 outputs the virtual vibration having different patterns corresponding to various events. A user perceives a particular event or a type of events occurring in the portable device 100-1, based on a pattern of the virtual vibration. Various vibration patterns will be further described with reference to FIGS. 5 through 6C.

Figure 5:
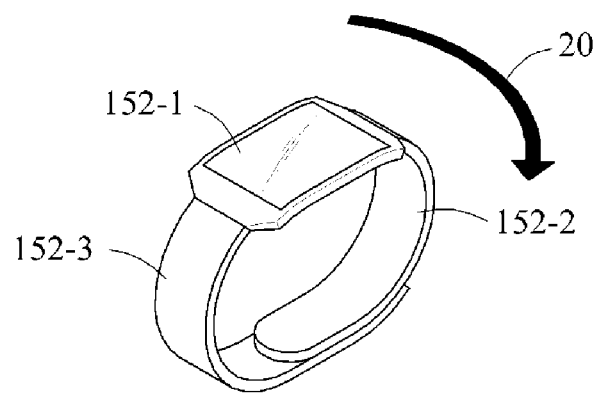
FIG. 5 illustrates an example of virtual vibration generated in a wearable device, in accordance with an embodiment.
Figure 5:
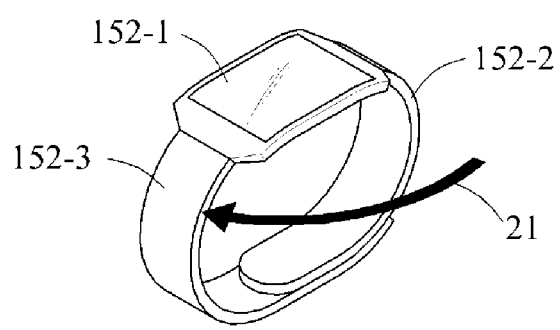

FIG. 5 illustrates an example of virtual vibration generated in a wearable device, in accordance with an embodiment.

FIG. 5 illustrates a first vibrator 152-1, a second vibrator 152-2, and a third vibrator 152-3 included in the portable device 100-1 of FIG. 2.

The portable device 100-1 may output virtual vibration to a position between the first vibrator 152-1 and the second vibrator 152-2, using the first vibrator 152-1 and the second vibrator 152-2. For example, the portable device 100-1 outputs virtual vibration in a direction 20, using the first vibrator 152-1 and the second vibrator 152-2. To output the virtual vibration, the portable device 100-1 gradually decreases an amplitude of vibration output from the first vibrator 152-1, and gradually increases an amplitude of vibration output from the second vibrator 152-2. Although the first vibrator 152-1 is configured in this example to gradually decrease the amplitude of the vibration output and the second vibrator 152-2 is configured to gradually increase the amplitude of the vibration output, a person of ordinary skill in the art will appreciate that one of the first vibrator 152-1 and the second vibrator 152-2 may decrease or increase the amplitude of the vibration output. In the alternative, the first vibrator 152-1 is configured to gradually increase the amplitude of the vibration output and the second vibrator 152-2 is configured to gradually decrease the amplitude of the vibration output.

Additionally, the portable device 100-1 outputs virtual vibration to a position between the second vibrator 152-2 and the third vibrator 152-3, using the second vibrator 152-2 and the third vibrator 152-3. For example, the portable device 100-1 outputs virtual vibration in a direction 21, using the second vibrator 152-2 and the third vibrator 152-3.

When a number of vibrators increases, a vibration pattern varies. The portable device 100-1 varies the vibration pattern, by adjusting at least one of a position in which the virtual vibration is output, a direction that the virtual vibration moves, and a speed at which the virtual vibration moves.

Figure 6A:
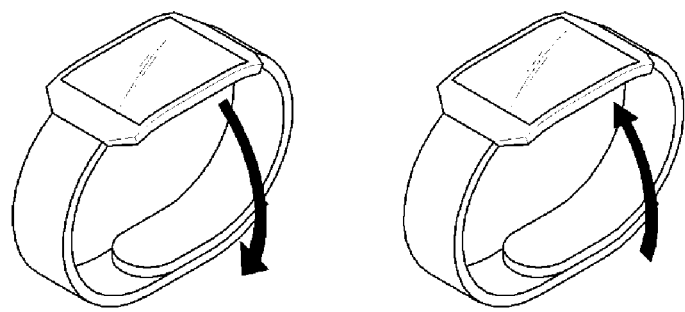
FIGS. 6A through 6C illustrate examples of virtual vibration corresponding to a signal transmission event and a signal reception event, in accordance with an embodiment.
Figure 6B:
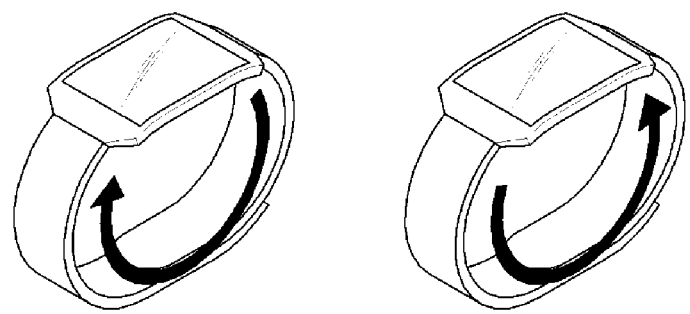
Figure 6C:
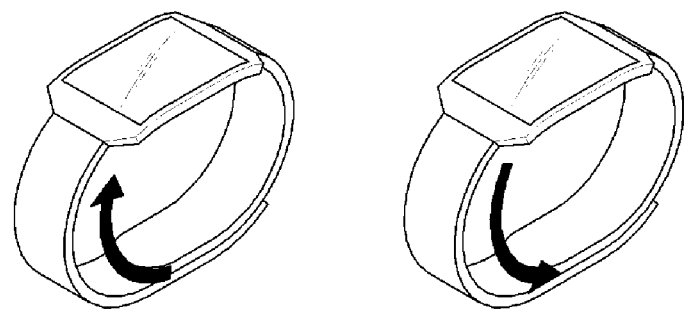

FIGS. 6A through 6C illustrate examples of virtual vibration corresponding to a signal transmission event and a signal reception event, in accordance with an embodiment.

The portable device 100-1 is, for example, a wearable device including a body and a strap, as shown in FIGS. 6A through 6C. Virtual vibration moves along the body or the strap. In an example, the virtual vibration moves from the body to the strap, or from the strap to the body. In another example, the virtual vibration rotates along the strap.

In an example, in response to the signal transmission event, virtual vibration moves from the body to the strap. In another example, in response to the signal reception event, virtual vibration moves from the strap to the body. A user may intuitively recognize reception of a predetermined signal, based on the virtual vibration moving towards the body, and intuitively recognize transmission of a predetermined signal, based on the virtual vibration moving towards the strap.

FIG. 6A illustrates an example of virtual vibration corresponding to a first signal transmission event and a first signal reception event, in accordance with an embodiment. The first signal transmission event is, for example, a message transmission event, and the first signal reception event is, for example, a message reception event.

FIG. 6B illustrates an example of virtual vibration corresponding to a second signal transmission event and a second signal reception event, in accordance with an embodiment. The second signal transmission event is, for example, an outgoing call event, and the second signal reception event is, for example, an incoming call event.

FIG. 6C illustrates an example of virtual vibration corresponding to a third signal transmission event and a third signal reception event, in accordance with an embodiment. The third signal transmission event is, for example, a file transmission event, and the third signal reception event is, for example, a file reception event.

As described above, virtual vibration corresponding to a signal reception event and virtual vibration corresponding to a signal transmission event move in opposite directions. For example, the virtual vibration corresponding to the signal reception event move from a first point to a second point and the virtual vibration corresponding to the signal transmission event move from the second point to the first point.

Figure 7A:
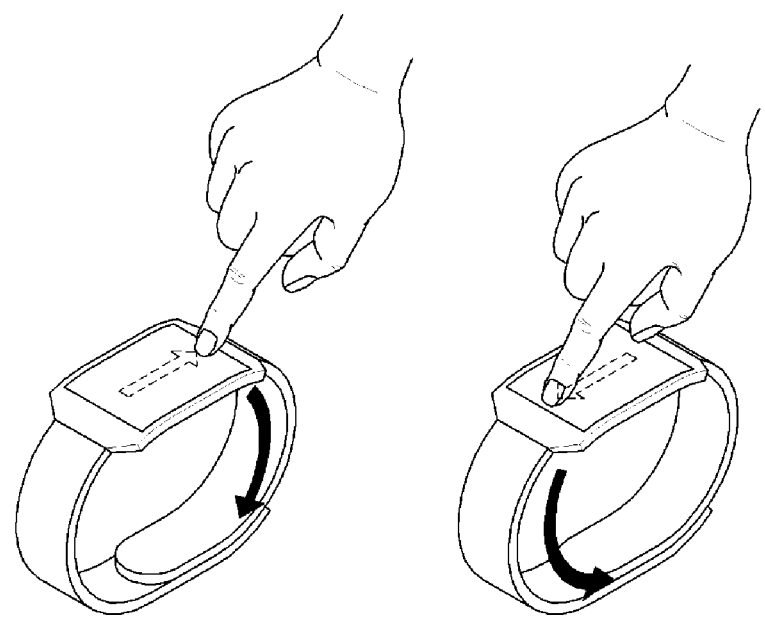
FIGS. 7A and 7B illustrate examples of virtual vibration corresponding to user input events, in accordance with an embodiment.
Figure 7B:
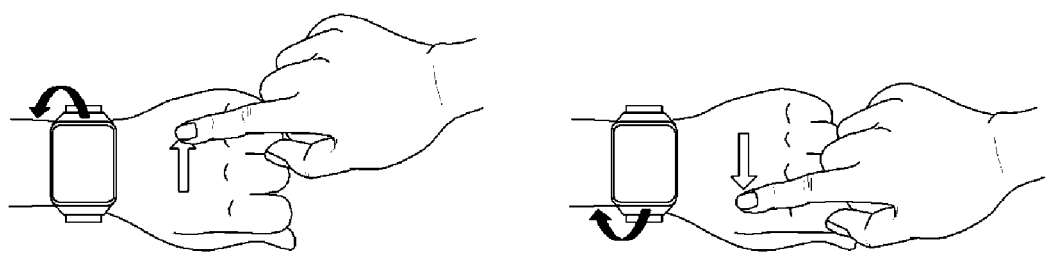

FIGS. 7A and 7B illustrate examples of virtual vibration corresponding to user input events, in accordance with an embodiment.

FIG. 7A illustrates an example of virtual vibration corresponding to a drag input for dragging a touch screen. When a user drags the touch screen upwards, upward virtual vibration is output. When the user drags the touch screen downwards, downward virtual vibration is output. In other words, the virtual vibration moves in a direction of a user drag input for dragging the touch screen.

FIG. 7B illustrates an example of virtual vibration corresponding to a drag input for dragging an input area of a back of a user's hand. As described above, the input area is a virtual area to sense a user input. When a user drags the back of the user's hand upwards, upward virtual vibration is output. When the user drags the back of the user's hand downwards, downward virtual vibration is output. In other words, the virtual vibration moves in a direction of a user drag input for dragging the input area.

For example, a signal transmission event occurs in response to the drag input. In this example, by the drag input, virtual vibration from a body of a portable device to a strap of the portable device is output.

Referring back to FIG. 1, the storage stores a vibration pattern matched to the event. The vibration pattern includes an output position, a moving direction, or a moving speed of the virtual vibration.

The output position refers to a position between vibrators among a plurality of vibrators to which the virtual vibration is output. The output position is, for example, a position between a first vibrator and a second vibrator.

The moving direction refers to a direction in which the virtual vibration moves from a vibrator to another vibrator. The moving direction is, for example, one of a direction of the first vibrator to the second vibrator, a direction of the second vibrator to the first vibrator, a direction in which the virtual vibration moving from the first vibrator to the second vibrator moves back to the first vibrator, and a direction in which the virtual vibration moving from the second vibrator to the first vibrator moves back to the second vibrator.

The moving speed refers to how fast the virtual vibration moves.

Based on the output position, the moving direction, or the moving speed, various vibration patterns may be defined. The storage matches various events to various vibration patterns, and store the matched events. The controller 151 generates a control signal based on the vibration pattern.

The sensing processor 154 senses a user input. The sensing processor 154 senses a user input to an input area that is at least a portion of an area adjacent to a portable device. The sensing processor 154 may include sensors in a sensor array, and a sensor controller. The sensor controller is connected to the sensors, to perform signal processing of the sensed user input and to control the sensors. The signal processing includes, for example, noise filtering of signals received from the sensors. The user input includes, for example, a tap input, a touch-and-hold input, a double tap input, a drag input, a panning input, a flick input, a drag-and-drop input, a swipe input, and a pinch input, which are performed by a user on the input area.

The sensor array includes a plurality of distance/proximity array sensors, or is implemented, for example, as a line type sensor. Additionally, the sensor array is designed in a structure of a plurality of layers. For example, when the sensor array is designed in a structure of a plurality of layers, a three-dimensional (3D) position with x-, y-, and z-axes, as well as, a two-dimensional (2D) position with x- and y-axes are sensed.

In an example, the sensor array includes a plurality of ultrasonic sensors. In this example, when a position of a finger is found using the ultrasonic sensors, the sensor array transmits and receives ultrasonic pulses, measures a period of time in which the ultrasonic pulses travel using a triangulation scheme of an arrival time of the ultrasonic pulses, and calculates the position of the finger. By using a ultrasonic sensor array, it is possible to achieve low power, and to avoid an influence by an illumination environment, for example, the sun.

In another example, the sensor array includes a 3D sensor in a form of a line. When the 3D sensor is used, the sensor array has a high resolution on an input area, for example, a back of a user's hand. Accordingly, the sensor array is utilized for a precise pattern recognition (for example, a character recognition). The input area refers to an area adjacent to a wearable device.

In still another example, the sensor array includes a dynamic vision sensor (DVS). When the DVS is used, the sensor array is driven with ultra low power, and senses a fast movement in an always-on state.

In yet another example, the sensor array includes a plurality of infrared ray (IR) sensors. When signals are transmitted from the IR sensors, an intensity of a finger detected to be in contact with an input area of the wearable device is measured, and a position of the finger is calculated. Additionally, a 2D position of the finger on the input area, that is, an area adjacent to the wearable device may be detected.

In the above example, the wearable device worn on a wrist is described, however, there is no limitation thereto. For example, the wearable device may be worn on an arm, using an arm band. In this example, it is possible to detect a user input to an input area, that is, an area adjacent to the wearable device, from the arm as well as the wrist.

Figure 8:
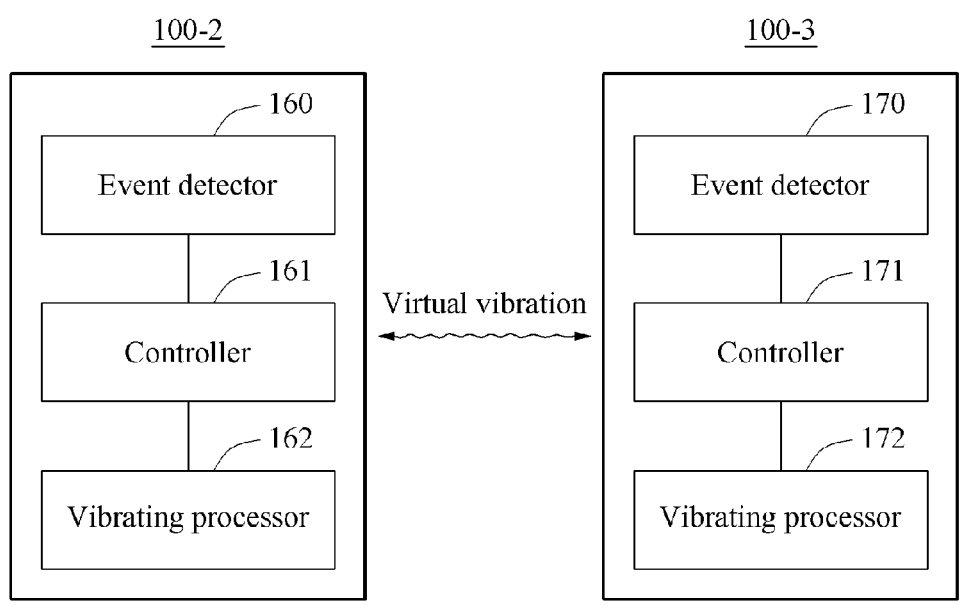
FIG. 8 illustrates an example of portable devices and an example of virtual vibration output between the portable devices, in accordance with an embodiment.

FIG. 8 illustrates an example of portable devices 100-2 and 100-3 and an example of virtual vibration output between the portable devices 100-2 and 100-3, in accordance with an embodiment.

Referring to FIG. 8, the portable device 100-2 includes an event detector 160, a controller 161 and a vibrating processor 162, and the portable device 100-3 includes an event detector 170, a controller 171 and a vibrating processor 172. The portable devices 100-1 through 100-3 are examples of the portable device 100 and accordingly, the above-description of the portable device 100 may be applicable to the portable devices 100-1 through 100-3. Additionally, description of the portable devices 100-1 through 100-3 may be applicable to each other.

The event detector 160 detects an event occurring between the portable devices 100-2 and 100-3. The controller 161 generates a control signal corresponding to the event. The vibrating processor 162 outputs first vibration to the portable device 100-2, based on the control signal.

The event detector 170 detects an event occurring between the portable devices 100-3 and 100-2. The controller 171 generates a control signal corresponding to the event. Based on the control signal, the vibrating processor 172 outputs a second vibration to the portable device 100-3.

The above-description of the event detector 150 may be applicable to the event detectors 160 and 170, and the above-description of the controller 151 may be applicable to the controllers 161 and 171. In addition, the above-description of the vibrating processor 152 may be applicable to the vibrating processors 162 and 172.

The first vibration and the second vibration cause a virtual vibration to occur between the portable devices 100-2 and 100-3. For example, the vibrating processor 162 may output vibration having a gradually decreasing amplitude, and the vibrating processor 172 may output vibration having a gradually increasing amplitude, so that virtual vibration moving from the portable device 100-2 to the portable device 100-3 may be output.

For example, when a signal is transmitted from the portable device 100-2 to the portable device 100-3, the vibrating processor 162 outputs a first vibration, in response to a signal transmission event in which a signal is transmitted to the portable device 100-3. Further, the vibrating processor 172 outputs a second vibration, in response to a signal reception event in which a signal is received from the portable device 100-3. In this example, a user intuitively recognizes that the signal is transmitted from the portable device 100-2 to the portable device 100-3.

The user perceives a type of an event occurring between the portable devices 100-2 and 100-3, based on the virtual vibration. The virtual vibration has been described above and, accordingly, further description of the virtual vibration is not repeated herein.

Each of the vibrating processors 162 and 172 includes a plurality of vibrators. As described above, the vibrating processor 162 outputs virtual vibration to the portable device 100-2, and the vibrating processor 172 outputs virtual vibration to the portable device 100-3. The virtual vibration and various vibration patterns have been described above and, accordingly, further description of the virtual vibration and various vibration patterns is not repeated herein.

Figure 9:
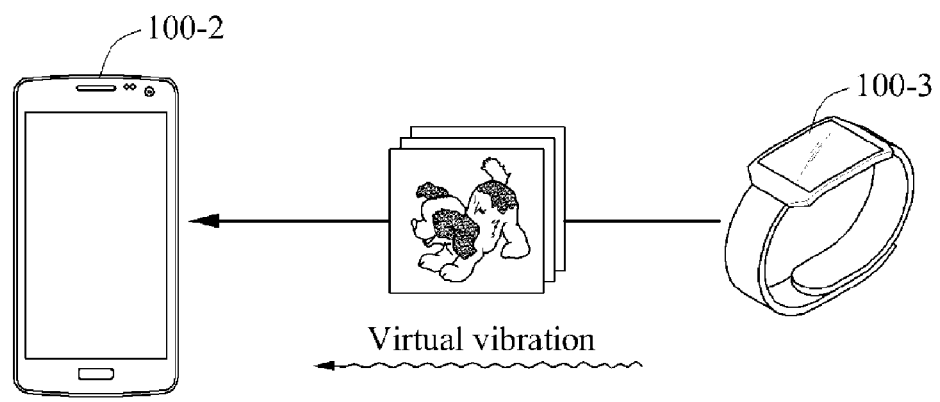
FIG. 9 illustrates an example of virtual vibration corresponding to an event occurring between the portable devices, in accordance with an embodiment.

FIG. 9 illustrates an example of virtual vibration corresponding to an event occurring between the portable devices 100-2 and 100-3, in accordance with an embodiment.

Referring to FIG. 9, the portable device 100-2 receives a file from the portable device 100-3. The portable device 100-2 may receive a message or an incoming call from the portable device 100-3.

The portable device 100-3 outputs first vibration, in response to a file transmission event. The portable device 100-2 outputs second vibration, in response to a file reception event. An amplitude of the first vibration gradually decreases, and an amplitude of the second vibration gradually increases. In other words, an amplitude of vibration gradually decreases in signal transmission, and an amplitude of vibration gradually increases in signal reception. Accordingly, a user recognizes that virtual vibration moves from the portable device 100-3 to the portable device 100-2. Because a file reception event occurs after a file transmission event, the second vibration outputs after the first vibration. Accordingly, the user intuitively recognizes that the portable device 100-2 receives a file from the portable device 100-3.

An amplitude of vibration may be adjusted based on transmission of a file. When a file is being received, an amplitude of vibration increases. When the file is being transmitted, an amplitude of vibration decreases. The user may recognize, based on vibration feedback, reception of data to the portable device 100-2, or transmission of the data from the portable device 100-3.

Figure 10:
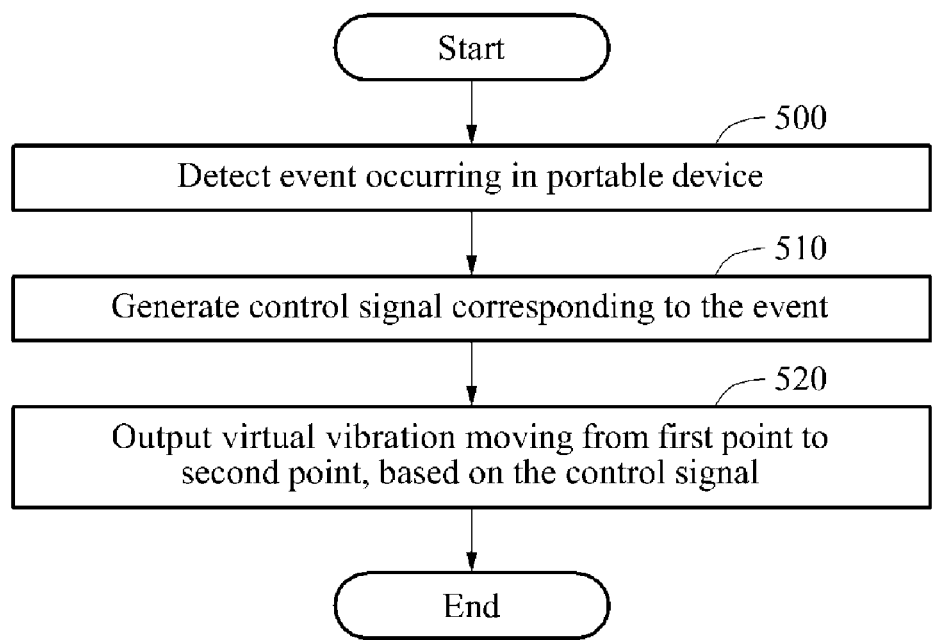
FIG. 10 illustrates an example of an operating method of a portable device for outputting virtual vibration, in accordance with an embodiment.

FIG. 10 illustrates an example of an operating method of a portable device for outputting virtual vibration, in accordance with an embodiment.

Referring to FIG. 10, in operation 500, the portable device detects an event occurring in the portable device.

In operation 510, the portable device generates a control signal corresponding to the event.

In operation 520, based on the control signal, the portable device outputs virtual vibration moving from a first point to a second point.

The above-described operations of the portable device 100 of FIG. 1 may be applicable to operations 500 through 520 of FIG. 10.

The apparatuses, units, circuits, vibrators, detectors, projector, devices, and other components illustrated in FIGS. 1-9 that perform the operations described herein with respect to FIG. 10 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 10 that perform the operations described herein with respect to FIGS. 1-9 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A portable device, comprising:
 a controller configured to generate a control signal corresponding to a detected event; and
 vibrators configured to output virtual vibration based on the control signal,
 wherein the vibrators comprises a first vibrator and a second vibrator and the detected event comprising an event of a first type and an event of a second type, and wherein in respose to the event of the first type detected, the first vibrator outputs a first vibration having a gradually decreasing amplitude based on the control signal, and the second vibrator outputs a second vibration having a gradually increasing amplitude, during the first vibration outputted by the first vibrator, based on the control signal, so that virtual vibration moving from the first vibrator to the second vibrator, in the portable device, is formed by the first vibration and the second vibration, and wherein in response to the event of the second type detected, the first vibrator outputs the second vibration based on the control signal, and the second vibrator outputs the first vibration, during the second vibration outputted by the first vibrator, based on the control signal, so that virtual vibration moving from the second vibrator to the first vibrator, in the portable device, is formed by the first vibration and the second vibration, and wherein the event of the second type indicates an opposite event of the first type.

2. The portable device of claim 1, wherein the first vibrator and the second vibrator output the virtual vibration by outputting different patterns of vibration based on the control signal.

3. The portable device of claim 1, further comprising: a strap,
wherein the vibrators are configured to output virtual vibration moving along the strap, based on the control signal.

4. The portable device of claim 3, wherein the virtual vibration rotates along the strap.

5. The portable device of claim 1, wherein the portable device comprises a body and a strap, and
wherein, based on the control signal, the vibrators are configured to output virtual vibration moving from the body to the strap.

6. The portable device of claim 1, wherein, based the detected event, the virtual vibration is identified by at least one of an output position, a moving direction, and a moving speed.

7. The portable device of claim 1, wherein, based on a control signal corresponding to a signal reception event, the vibrators are configured to output virtual vibration moving from a first point to a second point, and, based on a control signal corresponding to a signal transmission event, the vibrators are configured to output virtual vibration moving from the second point to the first point.

8. The portable device of claim 1, wherein, based on a control signal corresponding to a drag event, the vibrators are configured to output virtual vibration moving in a drag direction.

9. The portable device of claim 1, further comprising:
a storage configured to store a vibration pattern matched to the event,
wherein the controller is configured to generate the control signal based on the vibration pattern.

10. The portable device of claim 1, further comprising:
a sensing processor configured to sense a user input to an input area, the input area being at least a portion of an area adjacent to the portable device; and
an event detector configured to detect the event based on the user input.

11. The portable device of claim 10, wherein the user input comprises at least one of a tap input, a touch-and-hold input, a double tap input, a drag input, a panning input, a flick input, a drag-and-drop input, a swipe input, and a pinch input, which are performed by a user on the input area.

12. The portable device of claim 1, wherein the virtual vibration corresponding to a signal reception event and a virtual vibration corresponding to the signal transmission event move in opposite directions.

13. The portable device of claim 1, wherein in response to a number of vibrators increasing, the portable device changes at least one of a position, a direction, and a speed of the virtual vibration.

* * * * *